United States Patent Office 3,061,991
Patented Nov. 6, 1962

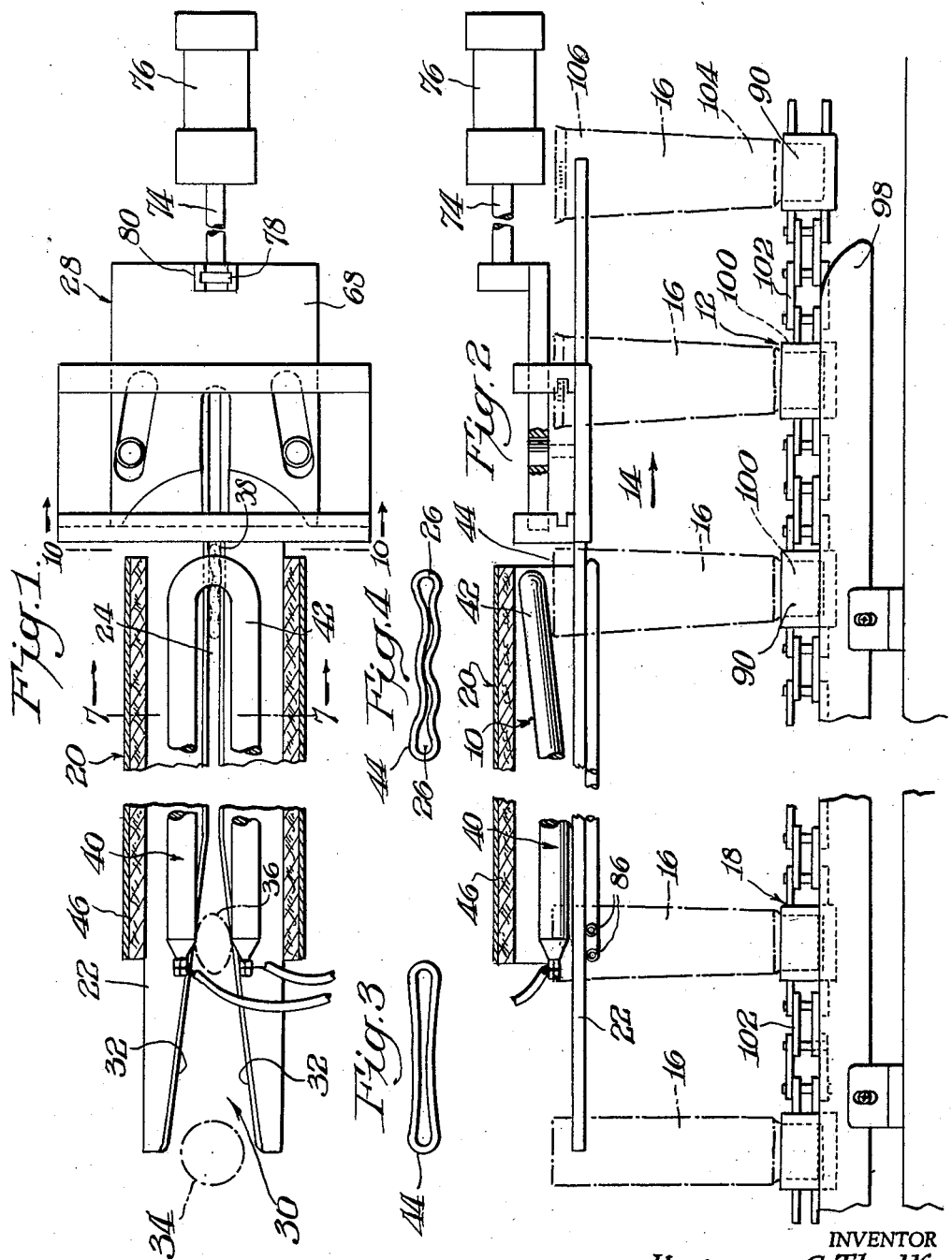

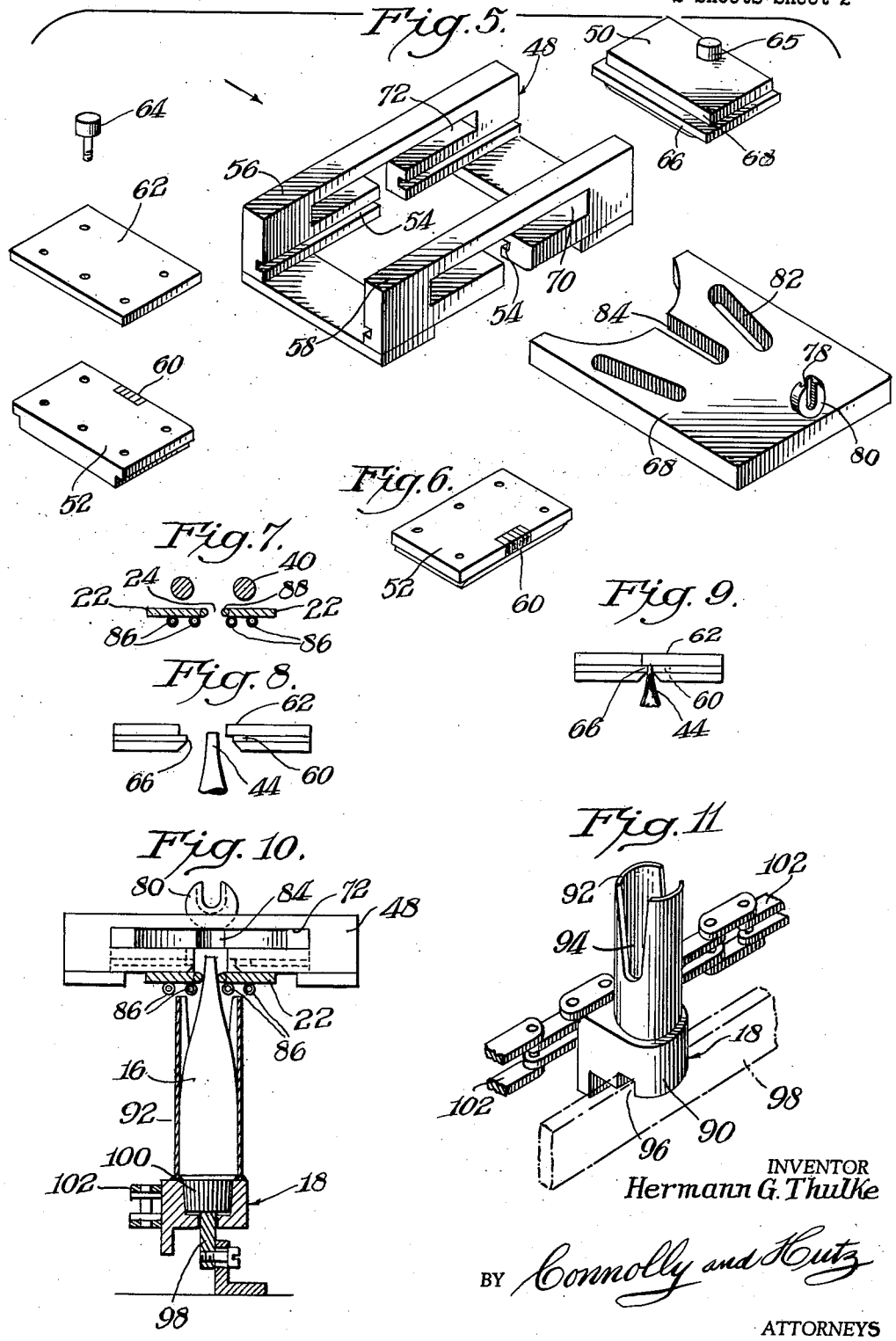

3,061,991
TUBE-SEALING METHOD AND APPARATUS
Hermann G. Thulke, Massapequa, N.Y., assignor to Chas. Pfizer & Co., Inc., New York, N.Y., a corporation of Delaware
Filed Jan. 22, 1959, Ser. No. 788,442
4 Claims. (Cl. 53—373)

This invention relates to a novel method and apparatus for sealing the ends of thermoplastic tubes, and more particularly relates to such a method and apparatus which lends itself to intimate association with a tube-filling machine.

There have been many methods and devices proposed for sealing the ends of tubes of thermoplastic material after they are filled.

Representative existing methods and apparatus of this type are described, for example, in U.S. Letters Patents 2,679,469 and 2,691,474. These methods and apparatus are rather effective, but they require the use of relatively complicated, expensive and bulky apparatus. This makes it difficult to intimately associate them with conventional tube-filling machines. Furthermore, automatic apparatus of this type is too bulky to permit it to be readily associated with existing conveyors such as those normally associated with conventional tube-filling machines.

It is accordingly an object of this invention to provide a simple and economical novel method and apparatus for sealing the ends of tubes of thermoplastic material that is simple enough to be practiced and installed in intimate relationship with the conveyor of a conventional tube-filling machine.

In accordance with this invention, the open ends of tubes made of thermoplastic material are passed through a channel which partially closes them without squeezing them enough to unduly drag upon the ends of the tube and distort them away from their direction of movement when they are soft. Excessive squeezing is easily avoided by making the passage wide enough to avoid squeezing the walls of the tube together. As the ends of the tubes are moved through the channel, radiant heat is applied thereto which makes the protruding ends of the tubes tacky and which incidentally might also cause the ends of the tubes to collapse partially into contact at various points. The channel is cooled as the radiant heat is applied to prevent the thermoplastic material from sticking to it. After the tacky ends of the tube pass out of the range of application of the radiant heat, they are clamped together to permanently seal them. This method and an apparatus for performing it is particularly well adapted for intimate association with a conveyor of the intermittently moving type because the channel does not require any synchronization with the conveyor, and a reciprocating clamping means can easily be synchronized with the motion of an intermittently moving conveyor. Furthermore, the structure of a novel apparatus for performing this method is remarkably compact enough to be mounted upon a run of the same conveyor already associated with a tube-filling machine for carrying tubes to and from it.

Novel features and advantages of the present invention will become apparent to one skilled in the art from a reading of the following description in conjunction with the accompanying drawings wherein similar reference characters refer to similar parts and in which:

FIG. 1 is a plan view partially broken away in cross section of one embodiment of this invention;

FIG. 2 is a view in elevation partially broken away in cross section of the embodiment shown in FIG. 1;

FIG. 3 is an enlarged schematic plan view of the end of a tube passing through a portion of the embodiment shown in FIG. 1;

FIG. 4 is another enlarged schematic plan view of a portion of the end of a tube passing through another portion of the embodiment shown in FIG. 1;

FIG. 5 is an exploded perspective view of the clamping portion of the embodiment shown in FIGS. 1 and 2;

FIG. 6 is a perspective view of one of the parts shown in FIG. 5;

FIG. 7 is a cross-sectional view taken through FIG. 1 along the line 7—7;

FIG. 8 is a view in elevation showing the relationship of the end of the tube to the jaws of the clamping device before they are closed;

FIG. 9 is a view in elevation showing the parts shown in FIG. 8 after they are closed;

FIG. 10 is a cross-sectional view taken through FIG. 1 along the line 10—10; and FIG. 11 is a perspective view of a portion of a conveyor for carrying the tubes through the embodiment shown in FIGS. 1 and 2.

In FIGS. 1 and 2 is shown a sealing apparatus 10 which is an embodiment of this invention associated with a conveyor 12 which is, for example, of the intermittently operated type and which is, for example, also associated with a tube-filling machine (not shown) for carrying empty tubes to it and filled tubes away from it. Conveyor 12 moves in the direction of arrow 14 from the filling machine (not shown) to a discharge station (also not shown). Apparatus 10 is, for example, arranged along a straight run of continuous conveyor 12 which, for example, moves in a horizontal plane in an oval path.

Tubes 16 made of thermoplastic material such as polyethylene of a wall thickness ranging, for example, from 0.010 inch to 0.020 inch are carried in holders 18 whose lower portions 90 are schematically represented in FIG. 2 and which are described in detail in entirety in FIGS. 10 and 11 and the discussion directed thereto.

In FIGS. 1 and 2 is shown an elongated channel means 20 including a pair of parallel rails 22 forming a passageway or channel 24 which is restricted enough to maintain the walls of the tube approximately parallel to each other without being restricted enough to squeeze the tube ends enough to set up drag forces which might distort them away from their direction of movement when they are heated. For tubes of the aforementioned wall thickness, passageway 24 has been found to operate successfully when it ranges from spacings of, for example, 3/16 inch to 1/2 inch. When, for example, passageway 24 is 3/16 inch in width, the closest portions of the tube wall in the initial cold portions of travel through passageway 24 are still approximately 1/16 inch apart as shown in double size in FIG. 3. However, after heat is applied to the end of the tube during its passage between rails 22, it collapses to the configuration shown in FIG. 4 in which various parts of the tube collapse into gentle contact with each other. However, even then, substantial areas, for example, loops 26 at the ends of the tube are still maintained apart.

In the embodiment shown in FIG. 1, for example, the total length of rails 22 up to clamping section 28 is eighteen inches long. A convergent entrance 30 is provided for passageway 24 by cutting away the inside surfaces 32 of the ends of rails 22 to form a convergent or V-shaped throat 30 which smoothly guides the ends of the tubes as shown in FIG. 1 from the round configuration 34 through the oval shape 36 to the ultimate approximately parallel configuration 38. Convergent entrance 30 is, for example, approximately 4 inches long, and the end of radiant heater 40 disposed, for example, substantially parallel to passageway 24, immediately above rails 22 starts approximately in the vicinity of the convergent entrance 30. However, the exact point of origination of radiant heat source 40 is not absolutely critical.

Radiant heater 40 is, for example, an electrical resistance type heater formed in a U-shape, and it is disposed as close as possible to rails 22 without contact therewith. The closed end 42 of heater 40 is bent away from rails 22 to permit the ends 44 of tubes 16 to pass under it without interference. A shield 46 incorporating insulating and reflective material is mounted about heater 40 to concentrate its heat upon the ends of the tubes passing between rails 22.

Clamping device 28 which is shown in FIGS. 1 and 2 in conjunction with sealing apparatus 10 and in more detail in exploded FIG. 5, includes a guide block 48 through which a pair of opposed clamping elements 50 and 52 reciprocate within pairs of opposed slots 54 formed in the innerfaces of projecting front and back walls 56 and 58. Clamping elements 50 and 52 are made of materials which do not readily adhere to thermoplastic material such as polyethylene; and they are, for example, formed of brass. A printing die 60 is inserted within the pressing face of clamping element 52, and it is retained therein by cover or shearing plate 62 which is fastened to clamping element 52 by cap screw 64. Clamping element 50 includes a projecting lower face 66 and a recessed upper face 67 which are engaged by shearing plate 62 and the other clamping element 52 which move from the position shown in FIG. 8 to that shown in FIG. 9 to simultaneously clamp the tacky end 44 of a tube 16 and seal it together, imprint a lot number upon the seam, and wipe off the tip of tube 44 lying above the engaging upper face of clamping element 66 and lower face of shearing plate 62.

The clamping elements formed by assembled parts 52, 62 and element 50 shown in FIG. 5 are reciprocated back and forth by a yoke plate 68 which is moved back and forth through passageways 70 and 72 in block 48 by the reciprocating movement of rod 74 as actuated, for example, by a pneumatic cylinder 76. The end of rod 74 is detachably connected to yoke plate 68, for example, by insertion within a vertical solt 78 cut within a projection 80 attached to yoke plate 68. Yoke plate 68 includes a pair of inclined slots 82 for engaging the head of cap screws 64 associated with assembled clamping element 52 and shearing plate 62 and the head of cap screw 65 inserted through clamping element 50. When yoke plate 68 moves backward and forward, it accordingly moves clamping elements 50 and 52 together and apart to seal and release the ends of tubes passing through the sealing apparatus. A slot 84 is cut through the longitudinal center line of yoke plate 68 to provide access to the space between clamping elements when they are actuated to move together.

In FIGS. 2, 7 and 10 is shown a cooling means which includes, for example, a number of tubes 86 made of heat conductive metal, for example, copper tubing. Tubes 86 are attached in heat exchange relationship with the lower surface of rails 22 which themselves are made, for example, of heat conductive and resistant steel. Connections (not shown) are provided for circulating cooling water through tubes 86 for maintaining rails 22 cool enough to prevent sticking of the heated thermoplastic material as the ends of the tubes pass through passageway 24 between them. Also as shown in FIGS. 7 and 10, the sides 88 of rails 22 which contact the ends of the tubes are made round and smooth by, for example, being formed of lengths of round drill rod attached to the inner surfaces of rails 22.

FIGS. 10 and 11 show the relative positions of holder assembly 90, the tubes held therein, rails 22 and guide block 48 of clamping assembly 28. As shown in FIG. 10, and in more detail in perspective FIG. 11, holders 18 include a lower block 90 upon which is mounted a tubular cup 92 which is cut out, for example, in the form of V-shaped notches 94 disposed in the direction of movement of holder 18. Notches 94 are of sufficient depth to permit the fishtail deformed front and rear edges of the ends of the tubes 16 to protrude through them as these ends are confined within passageway 24 while permitting the lower portions of the tube to be substantially confined within holder 18. Furthermore, a slot 96 extending in the direction of movement of holder 18 is formed in the bottom of lower section 90 to permit guide rail or cam rail 98 to pass therethrough for slightly lifting the capped end 100 of tubes 16 to raise the upper end 44 of tubes 16 a predetermined distance above rails 22 and slightly above the engaging surfaces of shearing plate 62 and clamping projection 66 of clamping element 50. Lower block 90 of tube holder 18 is attached to conveyor means 12 which, for example, includes sprocket chain 102 by firmly attaching blocks 90 to links of sprocket chain 102.

*Operation*

When, for example, sealing apparatus 10 is mounted along a substantially straight run of an oval conveyor 12 which intermittently carries capped tubes 16 to and from a tube-filling machine (not shown), filled tubes are carried in the direction of arrow 14 shown in FIG. 2 from the tube filling machine (not shown) towards a discharge station (not shown) which, for example, includes a plunger rod which moves upwardly through slots 96 in the bases 90 of holders 18.

In FIG. 1 is shown the round shape 34 of a tube end 44 as it enters convergent entrance 30 between rails 22. As tubes 16 move intermittently through passageway 24, the walls of the tube are deflected gradually towards each other as indicated by oval shape 36 until they partially close without becoming squeezed together enough to exert a drag upon the tubes which is great enough to distort them away from their direction of movement when they are softened by exposure to heat. In FIGS. 3 and 4 are respectively shown the configurations of the ends 44 of a tube 16 when they are respectively disposed in an early portion of its travel through passageway 24 and a later portion.

In FIG. 3 which corresponds to portions of travel of the tube approximately half way down its path of movement through passageway 24, the walls of the tube are maintained no closer than 1/16 inch apart when passing through rails 22 spaced only 3/16 inch apart. However when rails 22 are spaced farther apart to provide a passageway as wide as 1/2 inch, the closest portions of the tube are even disposed further apart than 1/16 of an inch, for example, as much as even 3/8 of an inch.

After radiant heat source 40 has heated the ends of the tubes, they collapse into the configuration shown in FIG. 4 in which portions of the tube wall gently contact each other. However, other portions, such as looped ends 26 are maintained fully separated. The cooling water passing through tubes 86 maintains rails 22 cool and prevents heated tube ends 44 from sticking to them. The loose guidance or deflection of the ends of the tubes highly facilitates conveyance towards the clamping assembly 28, and it unexpectedly simplifies the entire apparatus without unduly interfering with the formation of adequate seals. However, since the ends of the tube are not held firmly together before clamping as described in Patent 2,691,474, the seals formed thereby may not be as smooth and uniform as those provided by pre-existing methods and apparatus. However, they are unexpectedly good enough to cause any slight disadvantages to be completely overshadowed by the advantages of this remarkable simple method and apparatus.

When ends 44 of tubes 16 pass into alignment with clamping assembly 28, intermittently moving conveyor 12 positions them successively in line with clamping elements 50 and 52 of assemblies 28. A synchronizing means (not shown) actuates pneumatic cylinder 76 causing rod 74 to reciprocate yoke plate 68 towards rails 22. Inclined slots 82 in yoke plate 68 urge clamping plates 50 and 52 together through cap screws 64 and 65 moving them from the position shown in FIG. 8 to that shown in FIG. 9 to simultaneously clamp the ends of the tube together and smoothly wipe off the sealed end as shown in FIG. 9. At the same time a lot number is imprinted upon the seal by printing die 60. Since the tacky ends of the tubes are substantially out of the range of the heated zone, brass clamping plates 50 and 52 do not adhere to the thermoplastic material. Tubes 16 are then moved in the direction of arrow 14 past clamping assembly 28 towards a discharge or ejecting station (not shown).

Guide cam or rod 98 extends a sufficient distance through slot 96 in the base of holders 18 to contact the capped ends 100 of tubes 16 and raise them a sufficient distance to cause ends 44 to protrude a very short distance, for example 1/32 inch, above the pressing faces of clamping elements 50 and 52 to alow the sealed edge of the tube to be wiped smooth by shearing plate 62. Holders 18 by virtue of V-shaped notches 44 retain a substantially firm grip on the lower portions 104 of tube 16 as is schematically shown in FIG. 2. However, the upper sections 106 which fishtail in the direction of movement through channel 24 can extend through notches 94 in holders 18.

Another advantage of cooling rails 22, in addition to the prevention of sticking of tacky tube ends 44 thereto, is to prevent the wall of the tube below the rails from becoming weakened by the heat emanating from the heat source. Cooling of the rails accordingly prevents distortion of portions of the tube wall adjacent the joint as well as facilitating passage of the tubes through the channel.

What is claimed is:

1. An apparatus for sealing the ends of cylindrical tubes having relatively thin walls of thermoplastic material comprising a pair of stationary rails, the adjacent surfaces of said rails being spaced from each other at a distance which forms a narrow passageway between them having smooth parallel walls and a gradually convergent entrance, conveyor means disposed substantially parallel to said rails, said conveyor means including spaced holders for the lower ends of said tubes which are spaced and arranged relative to said rails in a manner which causes the upwardly extending open ends of said tubes to move through said pasageway with a short portion of said open ends extending above said rails, a heat source disposed above said rails adjacent the path of travel of said extending short portions of said open ends of said tubes above said rails for applying heat to make said extending short portions tacky, cooling means disposed in heat exchange relationship with said rails for preventing said tacky ends from adhering to said rails, said rails being spaced from each other at a distance which makes said passageway narrow enough to deflect said walls of said tubes into substantial adjacency with each other without creating enough drag upon said tacky ends to distort them away from the direction of movement of said tubes, said rails shielding the portions of said tube below said rails from said heat source disposed above said rails, said tube holders being arranged to firmly engage the lower ends of said tubes and to allow free flexing of their open ends for facilitating the movement of said tubes through said passageway, a clamping means disposed at an unrestricted continuation of said passageway out of the range of said heat source for forcing said tacky ends together into sealing contact, said rails being made of heat resistant and conductive material, said clamping means comprising a pair of reciprocating jaws and means for moving them together when a tacky end of a tube is disposed therebetween.

2. An apparatus for sealing the ends of cylindrical tubes having relatively thin walls of thermoplastic material comprising a pair of stationary rails, the adjacent surfaces of said rails being spaced from each other at a distance which forms a narrow passageway between them having smooth parallel walls and a gradually convergent entrance, conveyor means disposed substantially parallel to said rails, said conveyor means including spaced holders for the lower ends of said tubes which are spaced and arranged relative to said rails in a manner which causes the upwardly extending open ends of said tubes to move through said passageway with a short portion of said open ends extending above said rails, a heat source disposed above said rails adjacent the path of travel of said extending short portions of said open ends of said tubes above said rails for applying heat to make said extending short portions tacky, cooling means disposed in heat exchange relationship with said rails for preventing said tacky ends from adhering to said rails, said rails being spaced from each other at a distance which makes said passageway narrow enough to deflect said walls of said tubes into substantial adjacency with each other without creating enough drag upon said tacky ends to distort them away from the direction of movement of said tubes, said rails shielding the portions of said tube below said rails from said heat source disposed above said rails, said tube holders being arranged to firmly engage the lower ends of said tubes and to allow free flexing of their open ends for facilitating the movement of said tubes through said passageway, a clamping means disposed at an unrestricted continuation of said passageway out of the range of said heat source for forcing said tacky ends together into sealing contact, said conveyor including a means for moving it intermittently forward through substantially constant distances, said clamping means comprising a pair of jaws and means for moving them together at predetermined periods, and a synchronizing means being operatively associated with said conveyor means and said clamping means for causing said jaws to move together when said conveyor disposes the ends of a tube therebetween.

3. An apparatus for sealing the ends of cylindrical tubes having relatively thin walls of thermoplastic material comprising a pair of stationary rails, the adjacent surfaces of said rails being spaced from each other at a distance which forms a narrow passageway between them having smooth parallel walls and a gradually convergent entrance, conveyor means disposed substantially parallel to said rails, said conveyor means including spaced holders for the lower ends of said tubes which are spaced and arranged relative to said rails in a manner which causes the upwardly extending open ends of said tubes to move through said passageway with a short portion of said open ends extending above said rails, a heat source disposed above said rails adjacent the path of travel of said extending short portions of said open ends of said tubes above said rails for applying heat to make said extending short portions tacky, cooling means disposed in heat exchange relationship with said rails for preventing said tacky ends from adhering to said rails, said rails being spaced from each other at a distance which makes said passageway narrow enough to deflect said walls of said tubes into substantial adjacency with each other without creating enough drag upon said tacky ends to distort them away from the direction of movement of said tubes, said rails shielding the portions of said tube below said rails from said heat source disposed above said rails, said tube holders being arranged to firmly engage the lower ends of said tubes and to allow free flexing of their open ends for facilitating the movement of said tubes through said passageway, a clamping means disposed at an unrestricted continuation of said passageway out of the range of said heat source for forcing said tacky ends together into sealing contact, said radiant heat source comprising a U-shaped heater having a pair of elongated legs disposed parallel to said rails, said passageway being disposed parallel and between said legs, and the closed end of said U being bent a sufficient distance away from said rails to permit the ends of said tubes to pass continuously under it while said legs of said U are disposed as close as possible to said rails without actual contact therewith.

4. An apparatus for sealing the ends of cylindrical tubes having relatively thin walls of thermoplastic material comprising a pair of stationary rails, the adjacent surfaces of said rails being spaced from each other at a distance which forms a narrow passageway between them having smooth parallel walls and a gradually convergent entrance, conveyor means disposed substantially parallel to said rails, said conveyor means including spaced holders for the lower ends of said tubes which are spaced and arranged relative to said rails in a manner which causes the upwardly extending open ends of said tubes to move through said passageway with a short portion of said open ends extending above said rails, a heat source disposed above said rails adjacent the path of travel of said extending short portions of said open ends of said tubes above said rails for applying heat to make said extending short portions tacky, cooling means disposed in heat exchange relationship with said rails for preventing said tacky ends from adhering to said rails, said rails being spaced from each other at a distance which makes said passageway nrrow enough to deflect said walls of said tubes into substantial adjacency with each other without creating enough drag upon said tacky ends to distort them away from the direction of movement of said tubes, said rails shielding the portions of said tube below said rails from said heat source disposed above said rails, said tube holders being arranged to firmly engage the lower ends of said tubes and to allow free flexing of their open ends for facilitating the movement of said tubes through said passageway, a clamping means disposed at an unrestricted continuation of said passageway out of the range of said heat source for forcing said tacky ends together into sealing contact, said tube holders including a cup-shaped carrier, the walls of said cup-shaped carrier in line with its direction of movement being cut out to allow expansion of the upper portion of said tubes when they are deflected towards each other by said rails, and the lower ends of said carrier being constructed and arranged to engage the lower ends of said tubes closely enough to prevent tilting as they pass through said passageway.

References Cited in the file of this patent
UNITED STATES PATENTS

| | | |
|---|---|---|
| 2,140,117 | Salfisberg | Dec. 13, 1938 |
| 2,575,544 | Zinn | Nov. 20, 1951 |
| 2,606,850 | Piazze | Aug. 12, 1952 |
| 2,679,469 | Bedford | May 25, 1954 |
| 2,691,474 | Olson | Oct. 12, 1954 |
| 2,715,087 | Barradas | Aug. 9, 1955 |
| 2,778,175 | Bryce | Jan. 22, 1957 |